United States Patent [19]

Gaither

[11] Patent Number: 4,506,719
[45] Date of Patent: Mar. 26, 1985

[54] SEALING DEVICE FOR FACILITATING PRESSURING OF TUBELESS TIRE

[76] Inventor: Dolphard Gaither, Rte. 1, Box 43, Cameron, Okla. 74932

[21] Appl. No.: 427,952

[22] Filed: Sep. 29, 1982

[51] Int. Cl.³ ............................................. B60C 25/00
[52] U.S. Cl. ..................................................... 157/1.1
[58] Field of Search .................. 157/1, 1.1, 1.17, 1.21

[56] References Cited

U.S. PATENT DOCUMENTS 3,665,995  5/1972  Middleton ............................ 157/1.1
3,974,005  8/1976  Graml .................................. 157/1.1

Primary Examiner—James G. Smith
Attorney, Agent, or Firm—Head, Johnson & Stevenson

[57] ABSTRACT

A sealing device for facilitating pressuring of tubeless tires and comprising an endless hollow ring member adapted to be positioned at the hiatus between a deflated tire and the associated wheel rim, a plurality of tubular members are disposed within the ring member, and a cable extends through the inner tubular members and has opposite ends extending outwardly from the ring member through a port provided in the sidewall of the ring, clamp members are provided for engaging the exposed outer ends of the cable for adjusting the overall length thereof, and a plurality of roller members are disposed around the cable and disposed within the ring member. When air pressure is directed into the interior of the tire, the sealing device installed at the hiatus between the tire and the wheel substantially precludes the escape of the air at the hiatus, and when the internal pressure of the tire reaches a predetermined level, the ring member is automatically disengaged from the tire and the wheel. The internally disposed structures of the ring member preclude the necessity of manual holding of the ring member in the position during the pressuring operation, and the adjustment of the cable determines the internal pressure of the tire required for the release of the device. In addition, the internal roller members facilitate the release of the device from the engagement with the tire and wheel when the tire has reached the preselected internal pressure level.

3 Claims, 7 Drawing Figures

SEALING DEVICE FOR FACILITATING PRESSURING OF TUBELESS TIRE

BACKGROUND OF THE INVENTION

1. Field of the Invention

This invention relates to improvements in tire pressuring devices and more particularly, but not by way of limitation, to a sealing device for facilitating the pressuring of tubeless tires.

2. Description of the Prior Art

The pressuring of tubeless tires, and particularly the tires utilized on large vehicles, is a problem in that the inner periphery of the depressured tire is loosely disposed around the outer periphery of the tire wheel, and the application of air under pressure into the interior of the tire leaks through the space between the tire bead and the wheel rim. It is quite difficult to seal this hiatus between the tire and the wheel, and in fact the tire may explode during the pressuring operation, causing injury and perhaps even fatality. Devices have been developed for overcoming this problem, such as those shown in the Ranallo Pat. No. 2,874,759, issued Feb. 24, 1959, and entitled "Bead Seating and Inflating Device for Tubeless Tires;" the Varvaro U.S. Pat. No. 2,874,761, issued Feb. 24, 1959, and entitled "Bead Seating and Inflating Device for Tubeless Tires;" the Ericson et al U.S. Pat. No. 3,280,880, issued Oct. 25, 1966, and entitled "Method of and Apparatus for Inflating Tubeless Tires;" the Corless U.S. Pat. No. 3,552,469, issued Jan. 5, 1971, and entitled "Tire Bead Seater;" the Jordan U.S. Pat. No. 3,596,698, issued Aug. 3, 1971, and entitled "Tire Installation Device;" and the Kaminskas et al U.S. Pat. No. 3,658,109, issued Apr. 25, 1972, and entitled "Device for Mounting and Inflating Tubeless Tires." The devices have not proven satisfactory in the solution of the problem. For example, the Ericson et al patent discloses a device typical of that most widely used today, and the sealing ring must be held down by hand and requires substantially constant adjusting. Even with this operation, the device frequently fails, and does not result in a safe and efficient pressuring of the tire. In addition, devices of the type shown in the Kaminskas et al, Jordan, and Ranallo patents are frequently "blown out" of the engagement with the tire and wheel as the pressure within the tire increases, and thus not only resulting in an inadequate pressuring of the tire, but also creating a hazard to the personnel surrounding the tire.

SUMMARY OF THE INVENTION

The present invention contemplates a novel sealing means for facilitating pressuring of tubeless tires and which is particularly designed and constructed for overcoming the foregoing disadvantages. The novel device comprises a tube means formed in a circular configuration, with the opposite ends thereof in abutting relationship and secured together to form essentially an endless hollow ring. An inner tubular means extends around at least a portion of the interior of the endless ring, and a cable means extends through the inner tube and has the opposite ends thereof extending outwardly through a port provided in the sidewall of the endless ring. In addition, a plurality of rollers are journalled on the cable means within the interior of the endless tube, and clamping means is secured to the outer ends of the cable for providing an adjustment of the overall length of the cable means.

When a tubeless tire is to be pressurized, the tire and wheel are normally positioned on the surface of the ground or other substantially horizontally disposed surface, with the plane of the wheel and tire being substantially parallel thereto. This places one annular wall of the tire against the support surface, and the wheel rests against one of the tire beads by gravity, thus substantially precluding leakage of fluid therebetween, or at least reducing air loss therebetween during the air pressuring of the tire. The upper annular wall of the tire is normally loosely disposed with respect to the outer periphery of the wheel, and as the air is admitted into the interior of the tire, it tends to flow out through the hiatus between the tire bead and the rim of the wheel. The novel device of the invention is adapted to be positioned in the hiatus between the tire bead and the wheel rim to seal the space therebetween and preclude leakage of the air at the hiatus. Of course, it is the usual practice to apply a suitable lubricant, such as a detergent-water solution, or the like, around the inner periphery of the tire before seating the novel device thereon. As the air pressure within the tire increases, the tire bead begins to move in a direction toward the wheel rim, and as the hiatus therebetween begins to decrease in width, the novel device begins to move axially outwardly with respect to the tire and wheel. Whereas other devices of this general type require manual retention against the tire and wheel, the internally disposed cable means and inner tube means of the present device functions to maintain the sealing means in position between the tire bead and wheel rim until a preselected internal pressure is reached within the tire.

When the internal pressure of the tire reaches this preselected amount, the novel sealing device automatically disengages from the tire and wheel, and the tire will be efficiently pressurized.

When the sealing device releases or disengages from the tire and wheel, it may "fly" out from the wheel. In order to avoid this action, it may be desirable to provide a separate rope or cable means generally similar to the starter rope of an outboard motor, lawn mower, or the like, in engagement with the sealing device. With the use of the auxiliary cable or rope means, the sealing device may be quickly and efficiently removed from the engagement with the wheel and tire immediately upon the achievement of the preselected or desired internal pressure within the tire. A slight manual "jerk" or pull on the auxiliary rope means will immediately release the sealing device from the tire when this preselected internal tire pressure is reached. The novel sealing device is simple and efficient in construction and economical and durable in construction.

DETAILED DESCRIPTION OF THE PREFERRED EMBODIMENT

Figure 1:
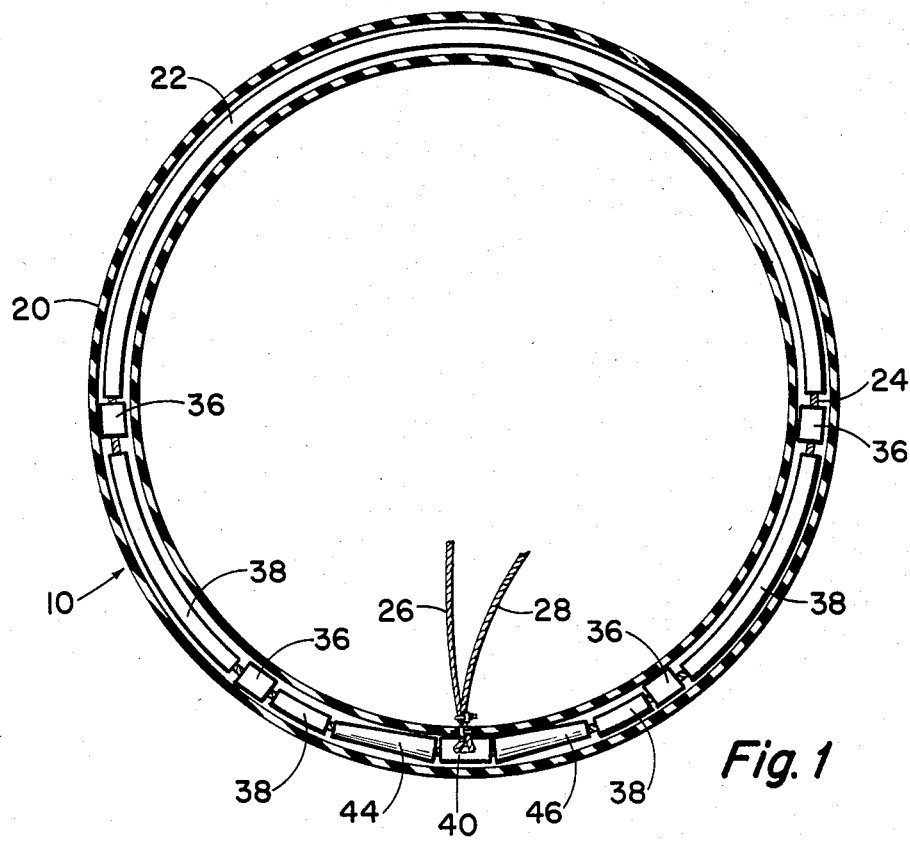
FIG. 1 is a sectional elevational view of a sealing device embodying the invention.

Referring to the drawings in detail, reference character 10 generally indicates a sealing device adapted to be positioned at the hiatus 12 between a wheel rim 14 and the bead 16 of a tubeless tire 18 in order to facilitate the inflating or pressurizing of the tire. The device 10 comprises an outer tubular member 20 formed into a substantially circular or annular configuration, as particularly shown in FIGS. 1, 6 and 7, with the outer ends of the tube 20 being placed in abutting relationship and secured together in any suitable manner (not shown) to provide a substantially endless ring. An inner tube means 22 is disposd within the outer tube 20 and preferably extends throughout substantially one-half the circumference of the ring 20. A cable means 24 of any suitable type, such as a wire rope, or the like, extends through the inner tube 22 and throughout the length of the ring 20, and the opposite ends 26 and 28 of the cable means 24 extend outwardly from the ring 20 through a port 30 (FIG. 2) provided in the sidewall of the ring 20. Suitable clamping means 32 and 34 engage the cable ends 26 and 28 for securely clamping the two ends of the cable together, and provide for an adjustment of the circular length of the cable means between the clamped portions of the ends 26 and 28 for a purpose as will be hereinafter set forth.

Figure 2:
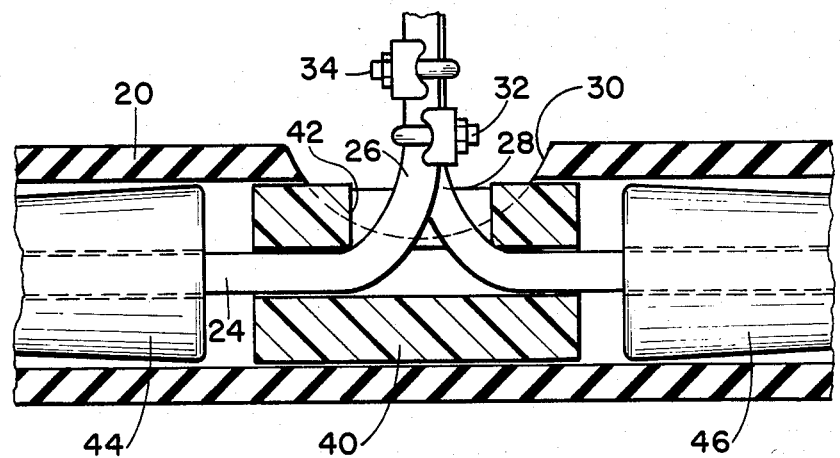
FIG. 2 is an enlarged broken sectional elevational view of a portion of a sealing device embodying the invention and particularly illustrating an adjustment means for an internal cable means utilized in the device.

A plurality of roller members 36 are disposed on the cable means 24 and within the interior of the ring 20, as particularly shown in FIG. 1, and in spaced relation along the cable means. In addition, a plurality of relatively short lengths of tubing 38 are disposed in the ring 20 and around the cable means 24 in spaced relation and preferably interposed between adjacent pairs of the roller member 36. A block means 40 is disposed within the ring 20 in the proximity of the port 30 and is provided with a central bore 42 extending longitudinally therethrough for receiving the opposite ends 26 and 28 of the cable means 24 therethrough. A port or aperture 42 is provided in the wall of the block means 40 whereby the ends 26 and 28 of the cable means 24 may extend outwardly therethrough and outwardly through the port 30 for access thereof at the exterior of the ring 20. A pair of substantially identical but oppositely disposed elongated rollers 44 and 46 having longitudinally tapered outer peripheries are disposed on the cable means 24 on opposite sides of the block means 40 and facilitate the release of the sealing device 10 from the hiatus 12 upon the inflation or complete pressurization of the tire 18 as will be hereinafter set forth.

Figure 3:
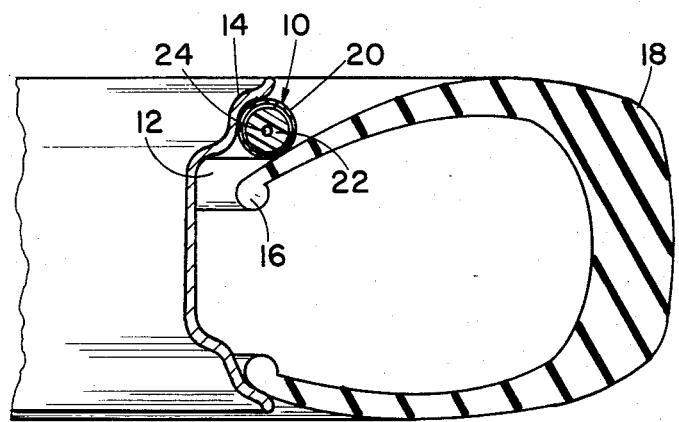
FIG. 3 is a broken sectional elevational view of a tire and wheel in a depressurized condition and having a sealing device embodying the invention installed thereon.
Figure 4:
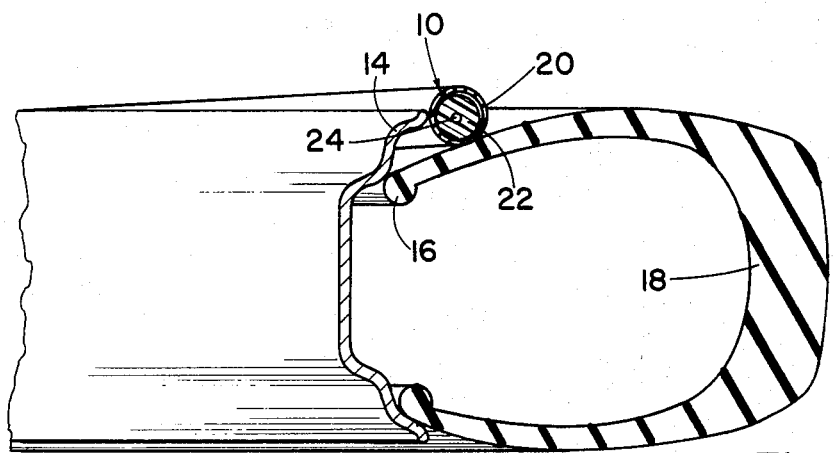
FIG. 4 is a view similar to FIG. 3 and illustrates the tire in a partially inflated condition.
Figure 6:
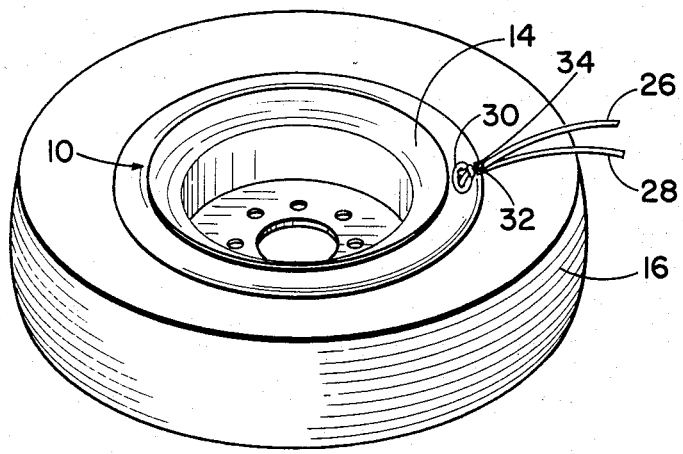
FIG. 6 is a perspective view of an entire wheel and tire having a sealing device embodying the invention installed thereon and illustrated with the tire in a deflated condition.

In order to pressurize the tire 18 by the use of the device 10 the tire 18 and wheel 14 are preferably initially placed in a substantially horizontal position as shown in FIGS. 3, 4 and 6 whereby the under or lower portions of the wheel and tire are held in an engaged position by gravity. This provides at least a minimal sealing between the tire and the wheel during the pressuring of the tire. The device 10 may then be positioned between the tire bead 16 and the wheel rim 14 for sealing the hiatus 12 therebetween, as particularly shown in FIGS. 3 and 6. Air may then be applied or directed to the interior of the tire 18 through the usual valve stem (not shown) in the usual or well known manner. The device 10 substantially precludes leakage of air pressure or fluid pressure at the hiatus 12 as the air is being admitted into the interior of the tire 18.

Figure 5:
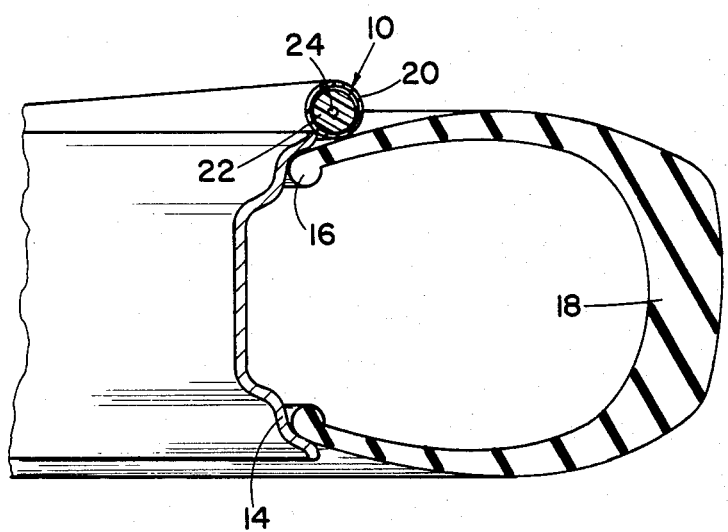
FIG. 5 is a view similar to FIGS. 3 and 4 and illustrates the tire in a completed inflated position.
Figure 7:
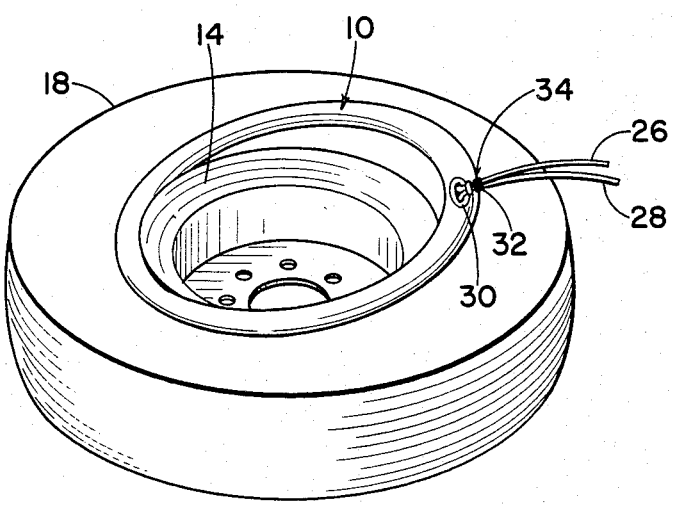
FIG. 7 is a view similar to FIG. 6 and illustrates the tire in a fully inflated condition with the sealing device embodying the invention being released from engagement with the tire and wheel.

As the air pressure within the tire 18 increases, as shown in FIG. 4, the tire bead 16 is flexed axially outwardly in a direction toward the wheel rim 14, and comes into engagement therewith. This closes the hiatus 12, and the device 10 begins to move axially outwardly from the position between the tire 18 and rim 14. When the tire 18 reaches the full internal pressurization thereof, as shown in FIGS. 5 and 7, the ring 20 or device 10 is forced completely out of engagement with the tire and "pops" away from engagement with the wheel rim 14. The roller members 38 and particularly the rollers 44 and 46 facilitate the disengagement of the ring 20 with the tire and wheel for ease of release of the device 10 therefrom.

The device 10 may be adjusted for release from engagement with the tire and wheel at substantially any desired internal pressure for the tire 18. For example, if it is desired that the pressuring of the tire be ceased when the internal pressure of the tire reaches thirty p.s.i., the device 10 may be so adjusted as to automatically release from the tire-wheel assembly at this particular internal pressure of the tire. The adjustment is made by the tightening or loosening of the cable means 24 within the interior of the ring 20. The cable means 24 may be adjusted as required to achieve the desired pressuring of the tire, and the ends 26 and 28 of the cable means may be clamped together by the clamp means 32 and 34 for holding the cable means in the proper operating position. In addition, in the event it is desired to preclude the "popping out" action of the device 10 when the selected internal pressure of the tire has been reached, a suitable auxiliary cable means (not shown), such as frequently used in starting an outboard motor, a lawnmower, or the like, may be removably secured to the ring 20, and the moment the device 10 releases from the tight engagement in the hiatus 10, and is positioned to indicate that the desired internal pressure of the tire has been reached, a slight manual pull or "tug" on the auxiliary cable will release the device 10 from the tire and preclude a "blowing off" of the device from the pressured tire and associated wheel.

It is to be noted that the provision of the internal cable means 24 and associated inner tubing and rollers precludes the necessity of manually restraining the device 24 for holding thereof in the hiatus 12 during the pressuring operation, thus not only increasing the efficient operation of the device, but also reducing the dangers inherent in the use of other devices of this type.

From the foregoing it will be apparent that the present invention provides a novel sealing device for facilitating pressuring of a tubeless tire, and comprises and endless hollow ring having adjustable cable means extending therethrough for supporting inner tube and roller means whereby the sealing device may be retained in a position between a tire bead and a wheel rim during the pressuring of the tire. The sealing device is automatically released from engagement with the tire and wheel when the internal pressure of the tire reaches a predetermined level. The novel device not only facilitates the pressuring operation of the tire but also greatly reduces the inherent dangers present in devices of this type by substantially eliminating any exploding of the tire or accidental release of the air therefrom.

Whereas the present invention has been described in particular relation to the drawings attached hereto, it should be understood that other and further modifications, apart from those shown or suggested herein may be made within the spirit and scope of this invention.

What is claimed is:

1. A sealing device for facilitating pressuring of a tubeless tire and adapted to be positioned in the hiatus between the deflated tire and the associated wheel, the sealing device comprising hollow endless tube means, cable means extending through said hollow endless tube means and having the opposite ends thereof extending outwardly from said tube means through port means provided in the sidewall of the tube means, and adjustment clamp means engageable with the opposite ends of said cable means for adjusting the overall length of the cable for facilitating retaining of the sealing device in position with respect to the tire and wheel during the tire pressuring operation without manual assistance and for facilitating automatic release of the sealing device from the engagement with the tire and wheel upon pressure of the tire to a preselected internal pressure level, and including inner tubular means disposed within said endless tube means and receiving the cable means therethrough, and wherein the inner tubular means comprises a first tubular member extending throughout substantially one-half the circumference of the endless tube means, a plurality of relatively short tubular members disposed on said cable means in spaced relation with respect to the first tubular member and each other, and including roller means disposed on said cable means and interposed between said inner tubular members for facilitating release of the sealing device from engagement with the tire and wheel upon internal pressurization of the tire to said preselected level.

2. A sealing device as set forth in claim 1 wherein said roller means includes at least one pair of substantially identical opposite disposed elongated roller members having longitudinally tapered outer peripheries for further facilitating release of the sealing device from the engagement with the tire and wheel.

3. A sealing device as set forth in claim 2 and including block means interposed between said elongated roller members for receiving the opposite ends of the cable means therethrough, said block means being provided with aperture means for receiving the cable ends therethrough whereby the cable ends extend exterior of said hollow endless tube means.

* * * * *